United States Patent
Danko

(10) Patent No.: US 9,785,543 B2
(45) Date of Patent: Oct. 10, 2017

(54) DUAL TAGGING BETWEEN TEST AND PODS

(71) Applicant: ORACLE INTERNATIONAL CORPORATION, Redwood Shores, CA (US)

(72) Inventor: Krisztian Danko, Waterloo (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/293,943

(22) Filed: Jun. 2, 2014

(65) Prior Publication Data

US 2015/0106788 A1   Apr. 16, 2015

Related U.S. Application Data

(60) Provisional application No. 61/889,462, filed on Oct. 10, 2013.

(51) Int. Cl.
*G06F 9/44* (2006.01)
*G06F 11/36* (2006.01)

(52) U.S. Cl.
CPC ...... *G06F 11/3688* (2013.01); *G06F 11/3664* (2013.01)

(58) Field of Classification Search
CPC ............. G06F 11/3664; G06F 11/3684; G06F 11/3692; G06F 11/3672; G06F 11/3676;
(Continued)

(56) References Cited

U.S. PATENT DOCUMENTS 7,210,066 B2 * 4/2007 Mandava ............ G06F 11/3676
714/38.14
7,603,658 B2 * 10/2009 Subramanian ...... G06F 11/3664
717/124
(Continued)

OTHER PUBLICATIONS

Allan J. Albrecht et al.; Software Function Source Lines of Code and Development Effort Prediction A Software Science Validation; 1983 IEEE; pp. 639-648; <http://ieeexplore.ieee.org/stamp/stamp.jsp?arnumber=1703110>.*
(Continued)

*Primary Examiner* — Thuy Dao
*Assistant Examiner* — Cuong V Luu
(74) *Attorney, Agent, or Firm* — Kilpatrick Townsend & Stockton LLP

(57) ABSTRACT

A method of applying test routines to pods in an automated application test suite may include receiving a selection of a pod representing an operating environment for an application from among a plurality of pods. The pod may be associated with one or more first required tags and/or one or more first provided tags. The method may also include receiving a selection of a test routine from among a plurality of test routines. The test routine may be associated with one or more second required tags and/or one or more second provided tags. The method may additionally include determining whether the one or more first required tags of the pod are satisfied by the one or more second provided tags of the test routine, and/or whether the one or more second required tags of the test routine are satisfied by the one or more first provided tags of the pod.

20 Claims, 10 Drawing Sheets

(58) Field of Classification Search
CPC ...... G06F 11/36; G06F 11/368; G06F 3/0482; G06F 11/3668; G06F 21/57; G06F 11/3688
See application file for complete search history.

(56) References Cited

U.S. PATENT DOCUMENTS

| | | | | |
|---|---|---|---|---|
| 8,281,286 | B2* | 10/2012 | Nguyen | G06F 11/3664 717/113 |
| 8,296,734 | B2* | 10/2012 | Geppert | G06F 11/3676 717/101 |
| 8,423,962 | B2* | 4/2013 | Becker | G06Q 10/06 717/124 |
| 8,561,036 | B1* | 10/2013 | Beans | G06F 11/368 717/124 |
| 8,719,788 | B2* | 5/2014 | Merry | G06F 11/3664 717/124 |
| 2003/0097650 | A1* | 5/2003 | Bahrs | G06F 11/3688 717/124 |
| 2004/0128584 | A1* | 7/2004 | Mandava | G06F 11/3676 714/38.14 |
| 2005/0193291 | A1* | 9/2005 | Subramanian | G06F 11/3664 714/710 |
| 2005/0229159 | A1* | 10/2005 | Haba | G06F 11/368 717/122 |
| 2007/0234127 | A1* | 10/2007 | Nguyen | G06F 11/3664 714/38.1 |
| 2009/0313606 | A1* | 12/2009 | Geppert | G06F 11/3676 717/124 |
| 2010/0229155 | A1* | 9/2010 | Adiyapatham | G06F 11/3672 717/124 |
| 2011/0088014 | A1* | 4/2011 | Becker | G06Q 10/06 717/125 |
| 2011/0225566 | A1* | 9/2011 | Muharsky | G06F 11/3664 717/124 |
| 2011/0296384 | A1* | 12/2011 | Pasternak | G06F 11/3688 717/124 |
| 2013/0152047 | A1* | 6/2013 | Moorthi | G06F 11/368 717/124 |
| 2013/0318397 | A1* | 11/2013 | Jamison | G06F 11/3664 714/32 |

OTHER PUBLICATIONS

Bernadette Szajna; Software Evaluation and Choice Predictive Validation of the Technology Acceptance Instrument; 1994 MIS; pp. 319-324; <http://www.jstor.org/stable/pdf/249621.pdf>.*

Chris F. Kemerer; An Empirical Validation of Robert W. Zmud Editor Software Cost Estimation Models; 1987 ACM; pp. 416-429; <http://dl.acm.org/citation.cfm?id=22906>.*

Anjaneyulu Pasala et al.; Selection of Regression Test Suite to Validate Software Applications upon Deployment of Upgrades; 2008 IEEE; pp. 130-138; <http://ieeexplore.ieee.org/stamp/stamp.jsp?arnumber=4483201>.*

Lori A. Clarke; A System to Generate Test Data and Symbolically Execute Programs ; 1976 IEEE; pp. 215-222; <http://ieeexplore.ieee.org/stamp/stamp.jsp?arnumber=1702368>.*

Elaine J. Weyuker; Testing ComponentBased Software A Cautionary Tale; 1998 IEEE; pp. 54-59; <http://ieeexplore.ieee.org/stamp/stamp.jsp?arnumber=714817>.*

* cited by examiner

| Operation | Cost (rule-based) | Cost (intersection table) | Cost (dual-tagging) |
|---|---|---|---|
| Add a new record of entity A ($n$ records) | $O(1)$ | $O(m)$ | $O(1)$ |
| Add a new record of entity B ($m$ records) | $O(1)$ | $O(n)$ | $O(1)$ |
| Return All matching A for given B | $O(n)$ | $O(n*m)$ | $O(n)$ |
| Return All matching B for given A | $O(n)$ | $O(n*m)$ | $O(m)$ |
| Add a new rule | $O(n) + O(m)$ + schema / query change | $O(n*m)$ | $O(n) + O(m)$ |

FIG. 6

DUAL TAGGING BETWEEN TEST AND PODS

CROSS-REFERENCES

This application claims the benefit of U.S. Provisional Application No. 61/889,462, filed Oct. 10, 2013, which is incorporated herein by reference.

BACKGROUND

Generally, software testing comprises a methodology for investigating the performance of a software product in order to provide stakeholders with information about the quality, reliability, and performance of a software product or service. Additionally, software testing may provide an independent, objective analysis of the software in order to allow a business to appreciate the risks of widescale implementation of the software. Therefore, software testing not only forms an important part of the software lifecycle, but is also important for sales and marketing and other aspects of customer satisfaction. Software testing techniques may include executing a program or application with the intent of finding software errors or defects. The software can be verified to meet the requirements of a software design document and satisfy the needs of a customer.

Depending upon the software testing methodology used, software testing can be implemented at any time during the lifetime of the software product. In Enterprise Software Systems, many thousands of software applications may be operating concurrently. Automated testing of these software applications may be implemented in order to keep software applications available to customers and constantly maintain their performance.

BRIEF SUMMARY

In some embodiments, a method of applying test routines to pods in an automated application test suite may be presented. The method may include receiving a selection of a pod representing an operating environment for an application from among a plurality of pods. The pod may be associated with one or more first required tags and/or one or more first provided tags. The method may also include receiving a selection of a test routine from among a plurality of test routines. The test routine may be associated with one or more second required tags and/or one or more second provided tags. The method may additionally include determining whether the one or more first required tags of the pod are satisfied by the one or more second provided tags of the test routine, and/or whether the one or more second required tags of the test routine are satisfied by the one or more first provided tags of the pod.

In some embodiments, a non-transitory, computer-readable memory comprising a sequence of instructions may be presented. The sequence of instructions, when executed by one or more processors, causes the one or more processors to perform operations including receiving a selection of a pod representing an operating environment for an application from among a plurality of pods. The pod may be associated with one or more first required tags and/or one or more first provided tags. The processor(s) may also perform operations including receiving a selection of a test routine from among a plurality of test routines. The test routine may be associated with one or more second required tags and one/or or more second provided tags. The processor(s) may additionally perform operations including determining whether the one or more first required tags of the pod are satisfied by the one or more second provided tags of the test routine, and/or whether the one or more second required tags of the test routine are satisfied by the one or more first provided tags of the pod.

In some embodiments, a system may be presented. The system may include one or more processors and a non-transitory memory communicatively coupled with and readable by the one or more processors and comprising a sequence of instructions which, when executed by the one or more processors, causes the one or more processors to perform operations receiving a selection of a pod representing an operating environment for an application from among a plurality of pods. The pod may be associated with one or more first required tags and/or one or more first provided tags. The processor(s) may also perform operations including receiving a selection of a test routine from among a plurality of test routines. The test routine may be associated with one or more second required tags and one/or or more second provided tags. The processor(s) may additionally perform operations including determining whether the one or more first required tags of the pod are satisfied by the one or more second provided tags of the test routine, and/or whether the one or more second required tags of the test routine are satisfied by the one or more first provided tags of the pod.

In various embodiments, the methods, products, and/or systems may include causing the test routine to be applied to the pod if it is determined that the one or more first required tags of the pod are satisfied by the one or more second provided tags of the test routine, and that the one or more second required tags of the test routine are satisfied by the one or more first provided tags of the pod. The methods, products, and/or systems may also include searching the plurality of test routines to locate a set of test routines for which required tags of the pod and required tags of the set of test routines can be satisfied, and applying the set of test routines to the pod. The methods, products, and/or systems may further include searching the plurality of pods to locate a set of pods for which required tags of the test routine and required tags of the set of pods can be satisfied, and applying the test routines to the set of pods.

In some embodiments, the pod may include an application, a software component operating with the application, an application version level, and/or hardware characteristics of a server on which the application is running. One or more second provided tags of the test routine may include tags that are not required by the one or more first required tags of the pod. One or more first provided tags of the pod may include tags that are not required by the one or more second required tags of the test routine. The pod may be selected by the automated application test suite.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 6 illustrates a chart depicting the relative cost and complexity of operations involved with three different relationship management techniques, according to some embodiments.

DETAILED DESCRIPTION

Figure 1:
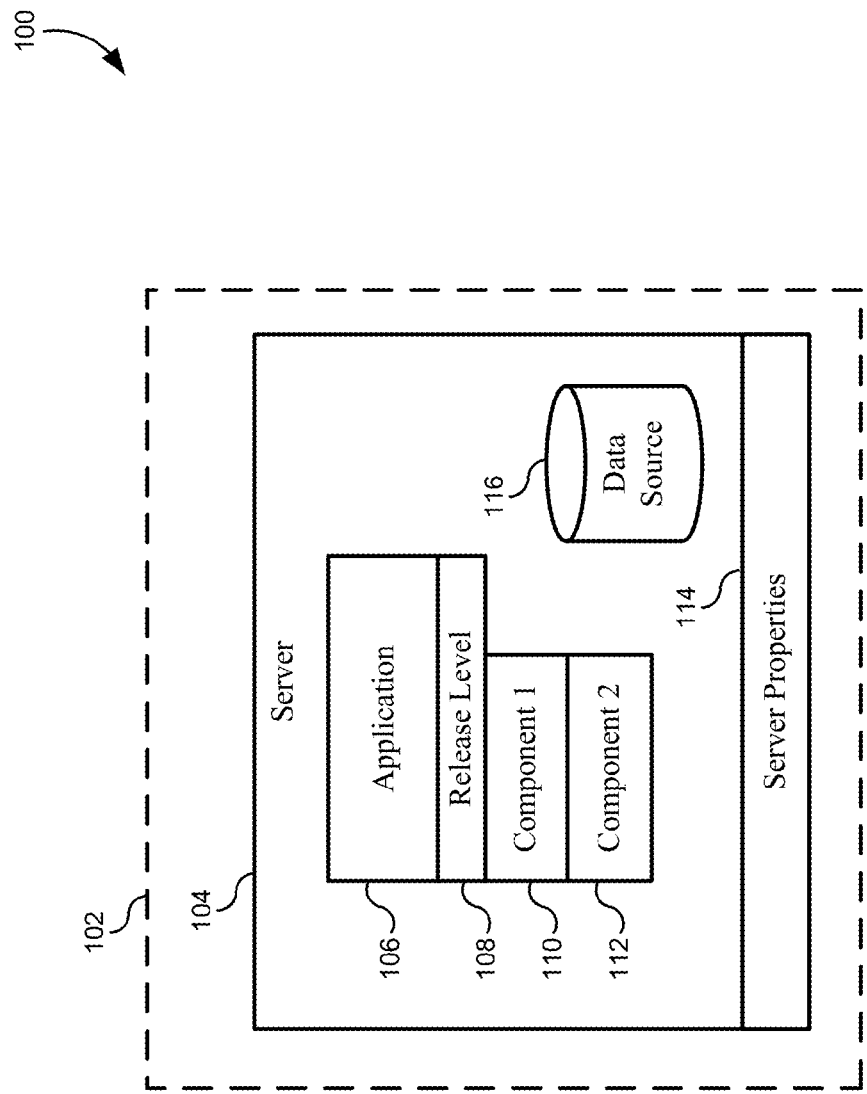
FIG. 1 illustrates a simplified block diagram of a pod, according to some embodiments.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for representing and using relationships between tests and pods to operate an automated automated application test suite. An enterprise software system may include hundreds or thousands of individual applications that may need to be tested without taking the system off-line. An application test suite performs automated tests on an application by, in some cases, performing automated tests while the applications are still available to customers. For example, one application test suite may automatically test web-browser-based applications while they are still available to customers of the enterprise. For large enterprise applications, several hundred or even thousands of instances of these applications spanning many physical servers may be present at any time. In some embodiments, read-only application testing involves simulating key presses, mouse clicks, or filling out forms as would be expected for user inputs. A test is deemed successful if a series of simulated user actions result in an expected output on the screen. Other cases may involve more complicated testing inputs and/or outputs. For example, entering search criteria into a text box, and clicking the search button is expected to return a certain list of search results. If the expected search does not appear in the browser as expected, then the test may fail to one degree or another.

Tests may be engineered to specifically interact with specific customer environments. As used herein, these customer environments will be referred to as "pods." Pods can be hosted by an Enterprise Software System (ESS) in a software-as-a-service model. The real-time application test suite can support many different tests that can be applied to thousands of different pods. However, not all tests are applicable to all pods. For example, some tests may only support a certain release level of the pod, such that pods on other release levels normally would not be tested using the version-specific test. Furthermore, there may be pods with a certain application components that may or may not be installed. Even if a test applies to a specific version of the pod, that test normally would not be run on the application if the component was not installed as part of the pod. There are other similar rules that can be used to determine when a test should or should not be applied to a given pod. Generally, the relationship between pods and tests can be described as a many-to-many relationship.

In order for a real-time application test suite to operate in an efficient manner, it may be desirable for the test suite to represent and store relationships in an efficient way. In some embodiments, these pod/test relationships may be stored such that the applicability of a given test can quickly be determined without requiring extensive comparisons or data lookups. In some embodiments, these relationships may be stored in such a way such that when a test changes, or a pod configuration changes, the maintenance costs are minimized in updating the relationship as represented in memory. In some embodiments, these relationships may be stored such that storage of the relationships is space efficient.

Database designs may use one of two different methods to express rules and relationships between pods and test entities. First, some database systems may use a rule-based model that keeps track of the attributes of both entities that are relevant when determining if a given test should be applied to a given pod. Using a rule-based approach, both test tables and pod tables would track attributes about the tests and pods, respectively. A query could be constructed that matches the pod records with the test records based on rules that are coded into the query. In a separate pod lookup table, attributes generally can be added for each application component to track whether or not they are installed in each pod. When matching tests against pods, queries can be developed that implement these rules and attributes when joining the two lookup tables together.

In other cases, database systems can create an intersection table, or junction table, that includes a record for each pod/test combination that is currently testable. Alternatively, some systems can assume that all combinations are available, and only create records for non-applicable combinations. In other words, each test will maintain a list of specific applications that are applicable, and/or vice versa. When a new pod is added, the intersection table would create applicable intersection records for tests that are applicable to the pod. When a new test is added, additional intersection records can be created for the pod applicable to the test.

Both of these approaches have significant disadvantages and drawbacks. While the first rule-based method may perform adequately when both entities have high cardinality, this method does not perform well if the rules and/or attributes change frequently. Each change may require a schema or query definition change, and would thus require frequent changes to the lookup tables. The rule-based method also does not work well when there are exceptions to the rules that are not generally represented over all pod/test combinations.

The second intersection table approach may work well when the rules and attributes change frequently because each change is simply implemented as an update to the intersection table. This method may also work well when there are exceptions to the rules, since each exception can be applied as a simple addition/removal from the intersection table. However, the intersection table approach does not work well when both entities have high cardinality, because the number of intersection records grows exponentially. This makes updating and running queries very costly. As new records are added, the update/query cost of the intersection table is O(n*m), where n and m are the record counts for each respective entity.

Some embodiments described herein may implement a third method using a dual tagging mechanism to express the many-to-many relationship between tests and pods. The dual tagging mechanism may have advantages over both of the above-described approaches without suffering from their drawbacks. The dual tagging solution can create instances for each entity in the relationship. For each entity, two tag lists can be created. The first tag list can include tags that are "required" by the entity. The second tag list can include tags that are "provided" by the entity. A relationship exists between two entities if the following conditions are met: Entity 1 "provides" all the tags "required" by Entity 2, and Entity 2 "provides" all the tags "required" by Entity 1. Therefore, the real-time application test suite can select two entities (e.g. a test and a pod), examine the "tags required" and "tags provided" list for each entity, and then determine whether the relationship pair exists by comparing the tags lists, i.e. whether the test should be applied to the pod.

This dual tagging solution offers advantages such that new rules can be added without schema or application changes. Instead, a new tag can simply be assigned to a group of records for both entities. Additionally, the number of database records does not need to grow exponentially as the entities are added, and thus storage of the many-to-many relationships is very efficient. While the dual tagging solution can be used in many different types of real-time application test suites, it may be most advantageous where both entities in the relationship can be grouped into a limited number of distinct groups, and the number of pairs does not increase linearly with the number of instances of the two entities. In other words, the number of unique rules/tags is low relative to the number of entity records. Exceptions can be handled by simply adding new tags.

FIG. 1 illustrates a simplified block diagram 100 of a pod 102, according to some embodiments. As used herein, the term "pod" may refer to an operating environment for a software application to be tested. In FIG. 1, the pod 102 includes an application 106. The application 106 may be part of an ESS, and may comprise a Customer Relationship Management (CRM) software product, along with any other software product available for an ESS system. In some embodiments, the application 106 may comprise a web portal, a web app, a mobile application, a server-side application, a database manager, and/or the like.

The application 106 may be associated with a particular release level 108. In some embodiments, multiple versions of the application 106 may operate within the pod 102, or may at least be available to operate within the pod 102. Each version of the application 106 operating in the pod 102 may be associated with a distinct release level 108. For example, a version of the application 106 operating in "Release Level 6" may be upgraded to "Release Level 7," and the release level 108 may be used to select and/or identify the version of the application 106 running within the pod 102. Some embodiments may use the release level 108 in an automated testing process.

The application 106 may also include one or more components 110, 112. The one or more components 110, 112 may include software components that can be added or installed along with the application 106. The one or more components 110, 112 may include components such as a search interface, a database interface, a software security product, a federated identity module, and/or the like. Note that some components can be installed and active, uninstalled, and/or installed and inactive. For example, some software components may be installed with the application 106, but are not activated unless a software license is purchased from a vendor. Therefore, some test applications described herein may specify that either certain components are installed and active, certain components are uninstalled, and/or certain components are installed but inactive.

In some embodiments, the pod 102 may also include the physical hardware or software environment on which the application 106 is run. For example, a server 104 may be included in the definition of the pod 102 for testing purposes. The server 104 may include a virtual server operating on a larger computer system, and/or a dedicated physical server. The testing tags described further below may include server properties 114 that are required by a test and/or provided by a pod 102. Server properties 114 may include throughput, available memory, processor speed, I/O configurations, network connections, network latency, and/or the like.

Additionally, the pod 102 may include other auxiliary software systems. For instance, the pod 102 may include a data source 116, such as a database, or an interface to a database provided through a relational database manager. The pod 102 may also include interfaces to remote processing capabilities, Web services, and/or the like.

Figure 2:
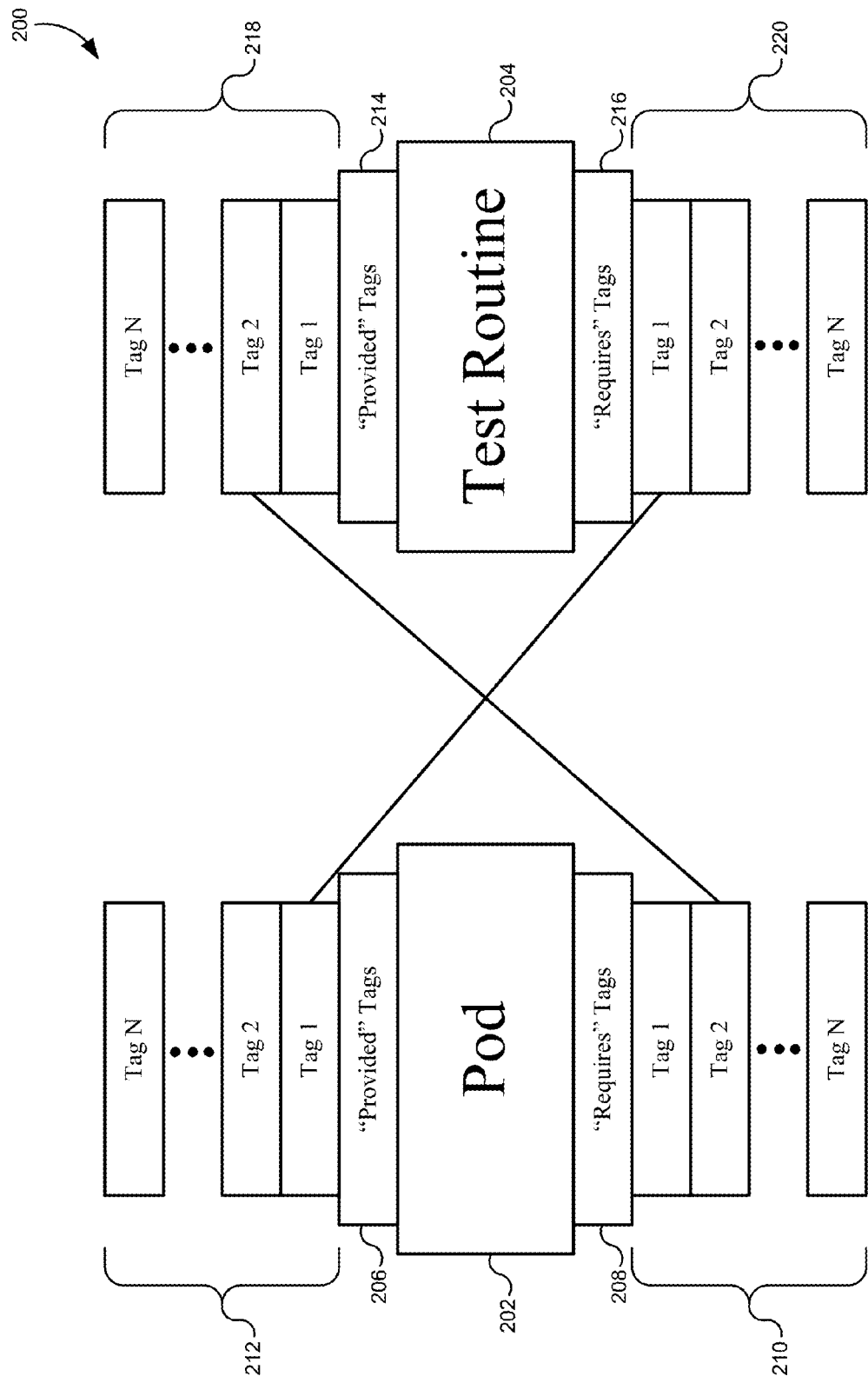
FIG. 2 illustrates a simplified block diagram of test routines and pods with required and provided tags, according to some embodiments.

FIG. 2 illustrates a simplified block diagram 200 of test routines and pods with required and provided tags, according to some embodiments. As described briefly above, the embodiments described herein provide for an efficient way to represent a many-to-many relationship between pods and test routines. A pod 202 may include a set of required tags 208 and a set of provided tags 206. The required tags 208 may include a list 210 of one or more tags that a test routine 204 is required to provide in order to be compatible with the pod 202. As used herein, the term "tags" may describe characteristics of any part of a pod, such as pod 102 described above in relation to FIG. 1.

The provided tags 206 may include a list 212 of one or more tags that are provided by the pod 202. Each of the provided tags describe characteristics of the pod that may be of utilized by designers of test routines in order to customize the test routines to the characteristics of the pod 202. In essence, the required tags 208 include characteristics that a test routine must have in order to be compatible with the pod 202. Similarly, the provided tags provide characteristics of the pod 202 that may be matched to requirements of a particular test routine.

A test routine 204 may also include required tags 216 and provided tags 214. Much like those of the pod 202, the required tags 216 may include a list 220 of one or more tags that describe required characteristics of any pod that is compatible with the test routine 204. Similarly, the provided tags 214 may include a list 218 of one or more tags that advertise characteristics of the test routine 204.

Generally, this method of using provided tags and required tags for each pod and each test routine provides for a fast and efficient method of both storing pods and test routines and matching pods and test routines together in an automated application test suite. Generally, a pod and a test routine are compatible if (1) the be required tags 208 of the pod 202 are satisfied by the provided tags 214 of the test routine 204, and (2) the required tags 216 of the test routine 204 are satisfied by the provided tags 206 of the pod 202. As illustrated in FIG. 2, "Required Tag 2" of the pod 202 is matched with "Provided Tag 2" of the test routine 204. Although not illustrated explicitly, this same matching required tags with provided tags may generally be used to determine compatibility for all required/provided tag combinations.

In some embodiments, the information depicted in FIG. 2 may be stored in a database that is separate from the code for the actual test routine 204, and/or separate from the actual operating environment of the pod 202. For example, a database table may include an identifier that identifies a particular pod or particular test routine. Rows in the database table may then identify both provided tags and required tags. In other embodiments, the test routine code itself can be stored with the provided and required tags. Similarly, the provided and required tags for a particular pod may be stored in the operating environment of the pod.

Figure 3:
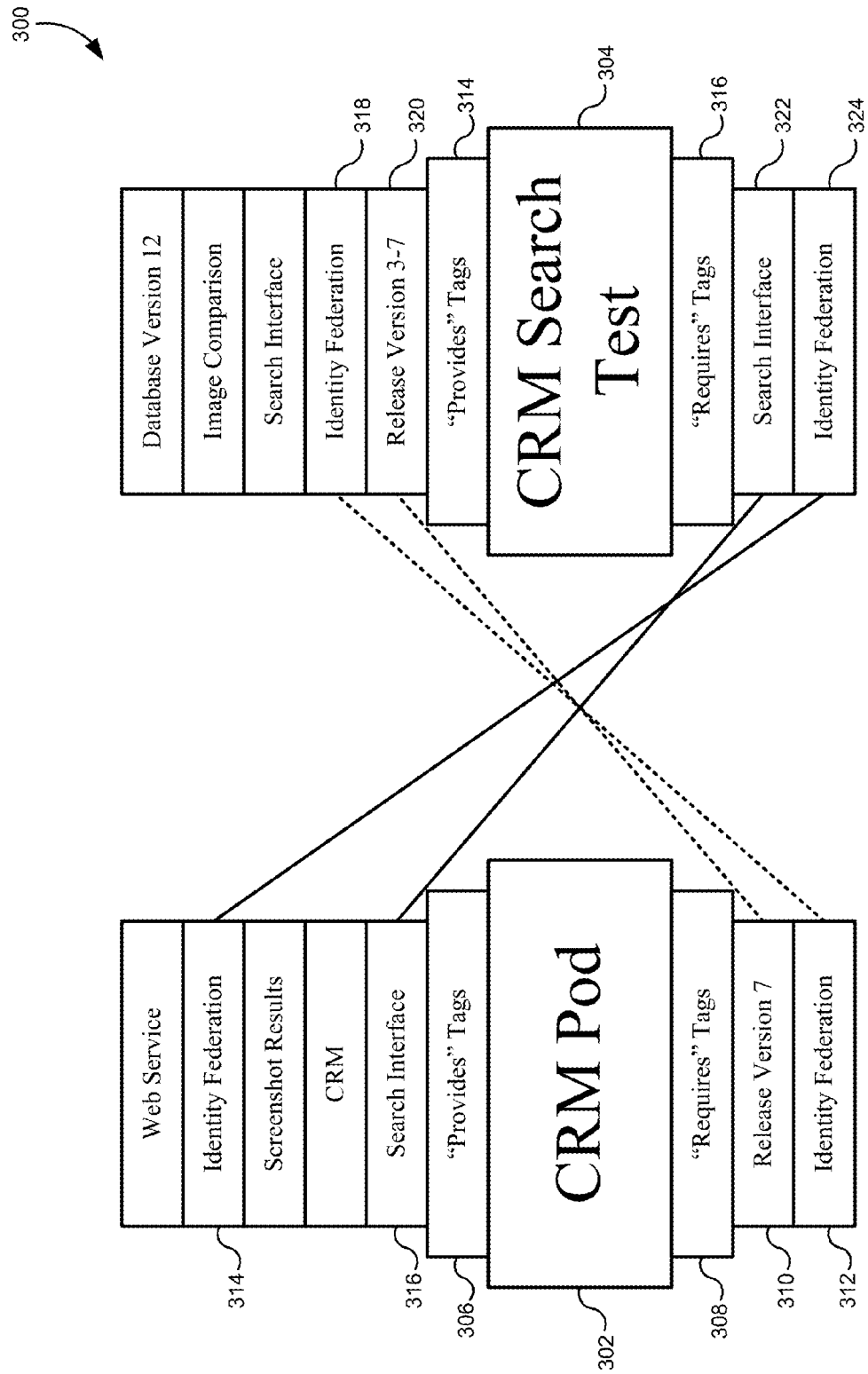
FIG. 3 illustrates a simplified block diagram of a test routine being matched to a pod based on their respective tags requirements, according to some embodiments

FIG. 3 illustrates a simplified block 300 diagram of a test routine 304 being matched to a pod 302 based on their respective tags requirements, according to some embodiments. In this embodiment, the pod 302 comprises a CRM application suite. The required tags 308 of the pod 302 include a release version 310, and an identity federation 312. In other words, the pod 302 requires any test to be compatible with release version 7 and an identity federation login scheme. In this embodiment, the test routine 304 comprises a CRM search test, which can test a search interface of the CRM application suite. The required tags 316 of the test routine 304 include a search interface 322 and an identity federation 324. In other words, for the CRM search test to be compatible with a pod, that pod must provide both a search interface and identity federation login scheme.

In order to determine whether the pod 302 and the test routine 304 are compatible, the required tags 308, 316 can be matched against provided tags 306, 314. The CRM pod includes provided tags 306 such as a search interface 316 and an identity federation 314. These tags can be matched against the required tags for the search interface 322 and the identity federation 324 of the CRM search test. In other words, the CRM pod advertises the fact that it includes a search interface and an identity federation login scheme by virtue of its provided tags 306. Similarly, required tags 308 of the pod 302 can be matched against the provided tags 314 of the test routine 304, such as the identity federation 318 and release versions 3-7 320. It should be noted that every provided tag of a pod/test routine does not need to be matched to a corresponding required tag. In many cases, and entity will provide more provided tags than it will required tags. Thus, in matching pods to test routines one or more of the provided tags for either entity may remain unmatched with a corresponding required tag. However, many embodiments require that every required tag for both the pod and the test routine be satisfied by a corresponding provided tag in order to apply the test routine to the pod.

Figure 4:
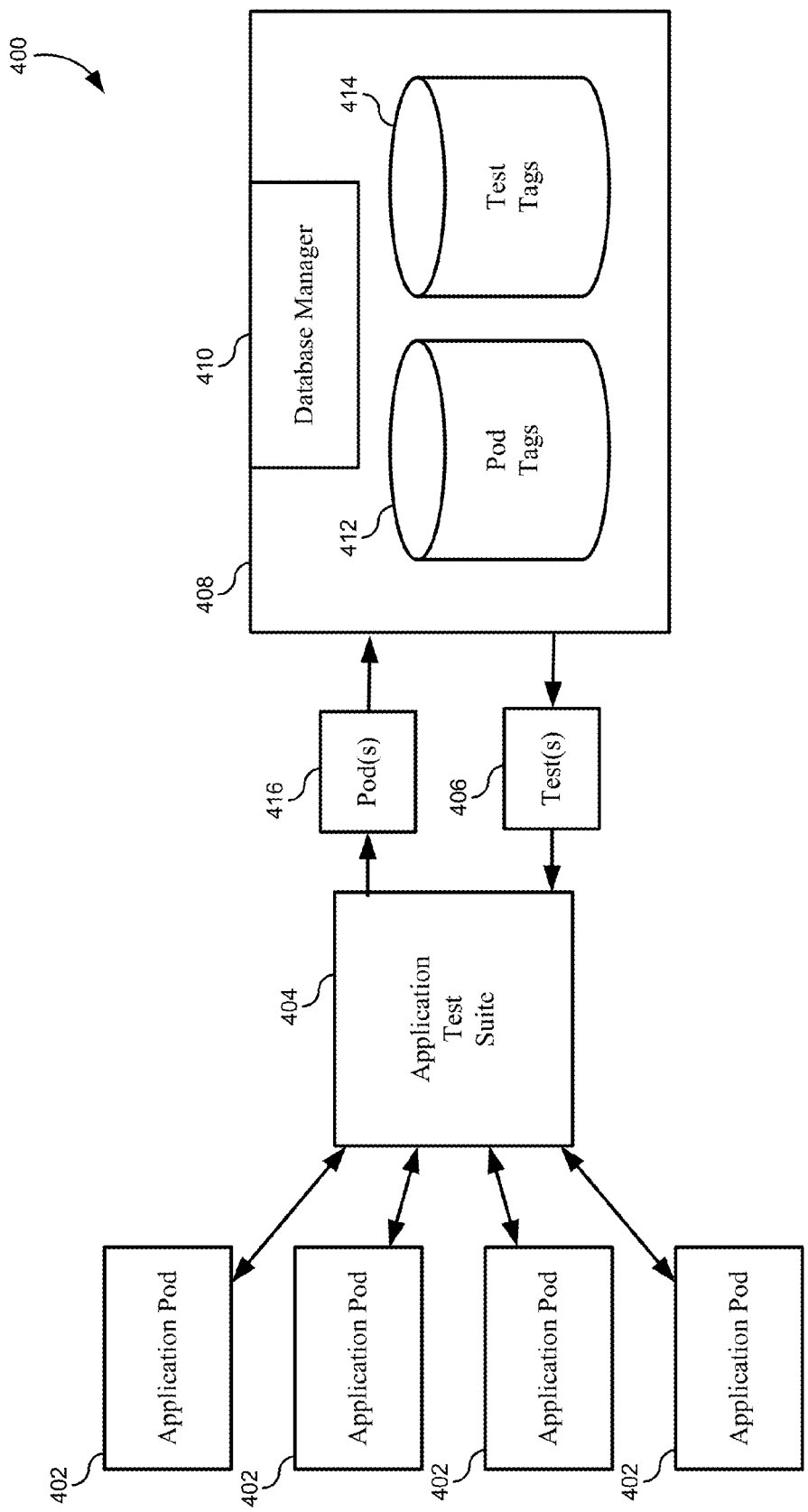
FIG. 4 illustrates a simplified block diagram of an application test suite environment, according to some embodiments.

FIG. 4 illustrates a simplified block diagram 400 of an application test suite environment, according to some embodiments. In many ESS environments, test routines may be applied to pods in an automated fashion. Many ESS environments will include thousands of applications operating on various servers and systems throughout an enterprise. Therefore, test routines may be scheduled to run regularly to constantly verify the veracity of each application running in its application environment.

An application test suite 404 may be configured to select one or more pods 402 for testing. The application test suite 404 may select pods 402 at random, or may follow a scheduled testing sequence. In some embodiments, the application test suite 404 may receive a selection of a pod 402 and then determine test routines that should be run against the selected pod 402. For example, the application test suite 404 may send an indication of the selected pod 416 to a database system 408 controlled by a database manager 410 to retrieve applicable tests. The database system 408 may include records representing pod tags 412 and/or records for representing test routine tags 414. The database system 408 can look up and/or receive required/provided tags for the selected pod and determine one or more test routines for which the required/provided tags can be satisfied for both the test routines and the selected pod. The application test suite can then receive an indication of the one or more test routines 406 and apply the one or more test routines to the selected pod 402.

In some embodiments, tags need not be stored in a database. Test tags can be implemented as annotations on the test methods within the source code. These annotations can therefore be compiled into the test program code and cached in memory. This is acceptable because the tags on tests only change when the tests themselves change and the tests are then recompiled. The tag lists for pods can be stored as dominated lists in the configuration file of the respective pod. Determining applicable tests for a given pod can take as little as a millisecond using current computing systems.

In another embodiment, the opposite procedure may take place. In other words, the application test suite 404 may receive an indication of a test routine to be run on any applicable pods. For example, a new test routine may be added to a library of test routines, and an enterprise administrator may wish to execute the test routine on any matching pods. As stated above, when designing the new test routine, software developers need not know all of the pods to which it may apply. They only need to define an interface in the form of provided and required tags and the application test Suite 404 can then match the pods automatically. This is also conversely true for application designers. Application designers need not know all the characteristics of tests that will be applied to a particular pod, instead they only need to define an interface in the form of provided and required tags. As described above, the database system 408 and/or the application test suite 404 can use the required/provided tags of the new test routine to determine one or more pods for which the required tags of each will be satisfied. The test routine can then be applied to each of the matching pods.

In some embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. Block diagram 400 represents an abstraction of the functions that may be implemented using these types of hardware. After reading this disclosure, one having skill in the art could use these well-known circuit elements to construct the device shown in FIG. 4 to implement these methods and systems.

In some embodiments, the various modules and systems in FIG. 4 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Figure 5A:
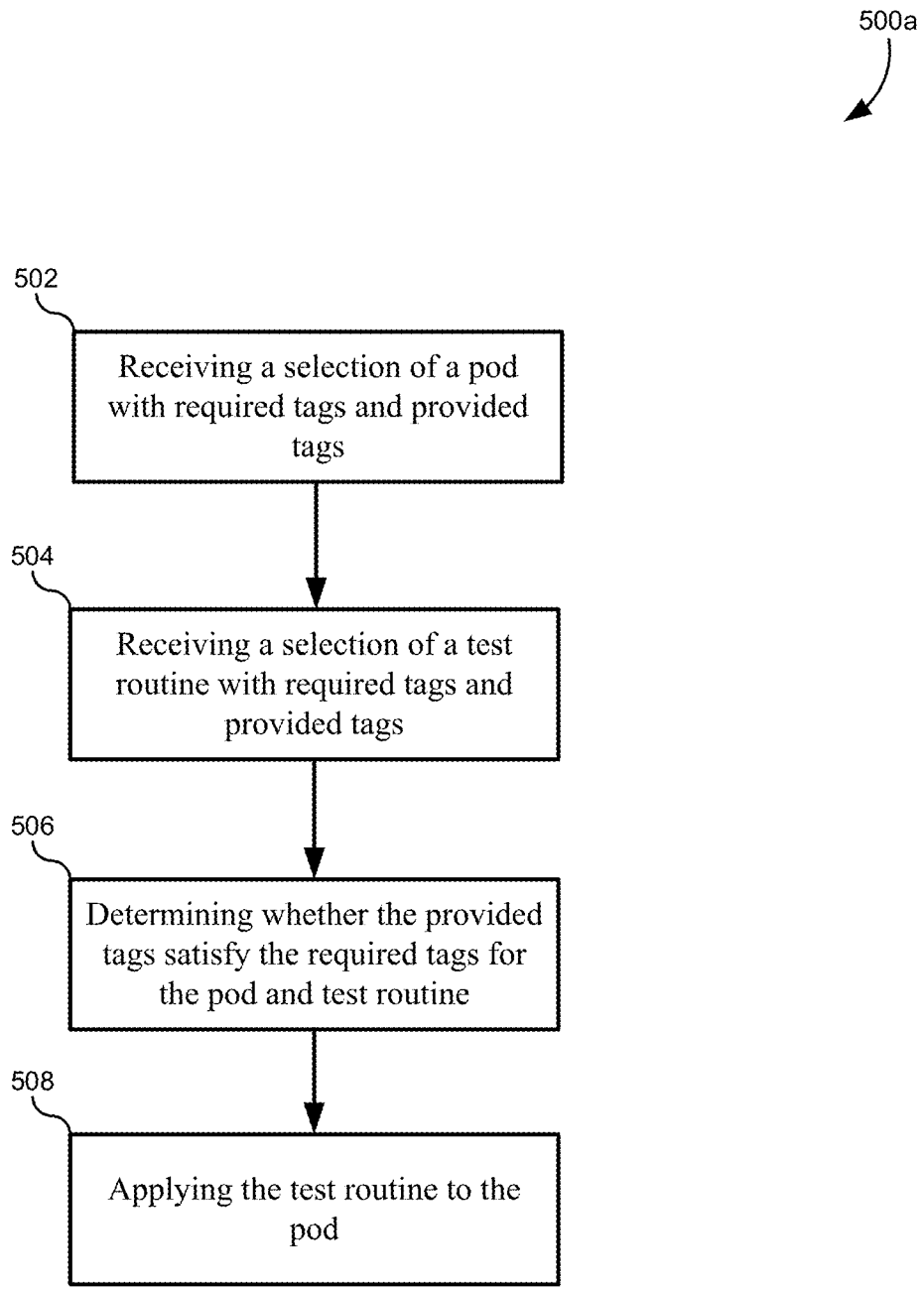
FIG. 5A illustrates a flowchart for a method of applying test routines to pods in an automated application test suite, according to some embodiments.

FIG. 5A illustrates a flowchart 500a for a method of applying test routines to pods in an automated application test suite, according to some embodiments. The method may include receiving a selection of a pod with required tags and provided tags (502). The pod may represent an operating environment for an application, and may be selected from among a plurality of pods. The pod may comprise one or more software components operating with the application, an application version level, and/or characteristics of the hardware on which the application is running as well as an operating system and network interfaces, latency, and/or other metrics that may describe the operating environment of the application.

The method may also include receiving a selection of a test routine with required tags and provided tags (504). The test routine may be selected from among a plurality of test routines. In some embodiments, more than one test routine may be selected from among the plurality of test routines, and the selection may be determined based on matching the required tags to provided tags as described above. In some embodiments, both the test routine and the pod may be selected by a real-time application test suite.

The method may additionally include determining whether the provided tags satisfy the required tags for the pod and for the test routine (506). In other words, it may be determined whether the provided tags of the pod satisfy the required tags of the test routine, and whether the provided tags of the test routine satisfy the required tags of the pod. As described above some embodiments need not require that every provided tag is also matched with required tag between the test and the pod. In other words, provided tags may remain unmatched so long as each required tag is matched to a provided tag in the corresponding pod/test routine. Thus, one or more of the provided tags of the pod may include tags that are not required by the required tags of the test routine, and vice versa.

Figure 5B:
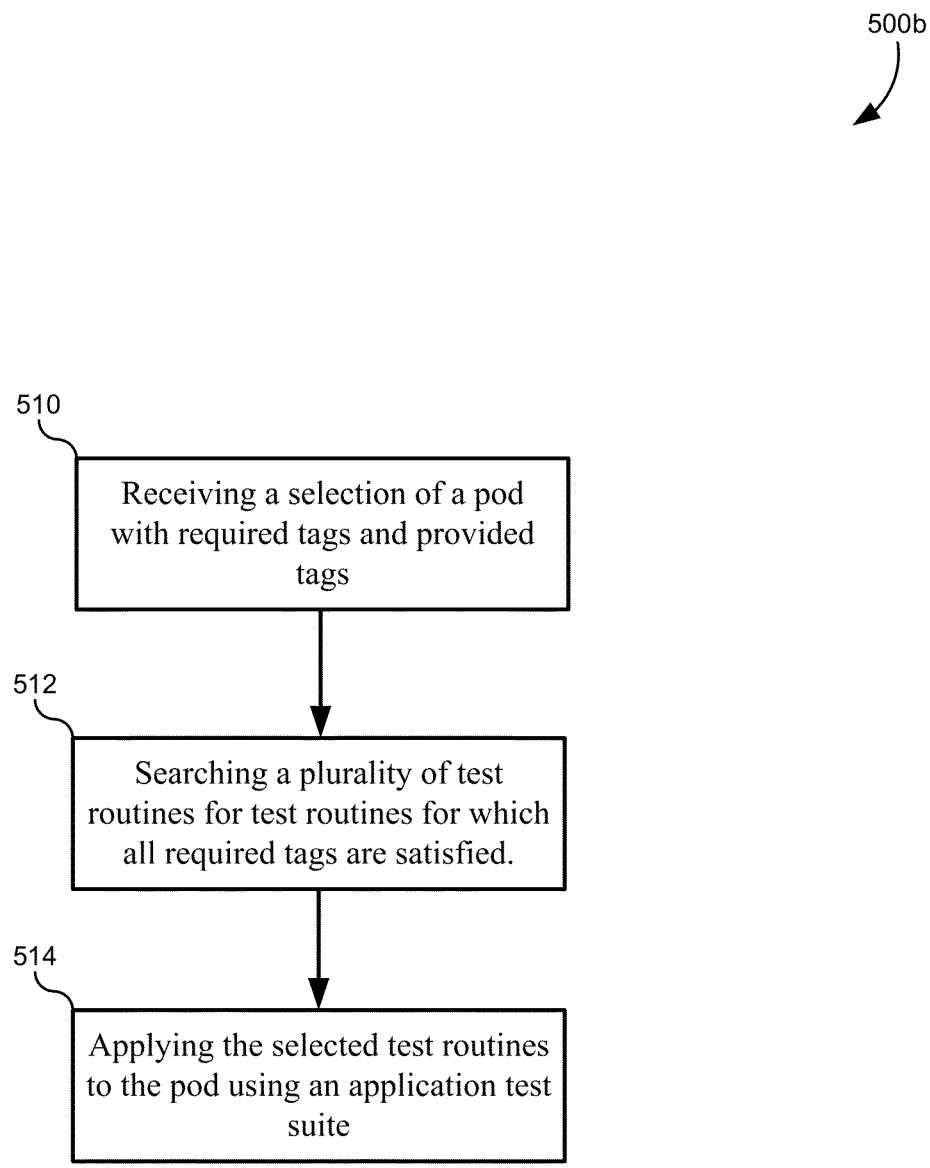
FIG. 5B illustrates a flowchart for a method of selecting from among a plurality of test routines to apply to a selected pod in an automated application test suite, according to some embodiments.

The method may further include applying the test routine to the pod (508). Note that in some embodiments, the application of the test routine the pod may be part of a automated testing procedure wherein numerous test routines are selected and applied to a single pod. In this case, the method may also include searching a plurality of test routines to find test routines that can be matched to the tags of the selected pod. The method may then include applying each test routine to the pod. Similarly, the single test routine may be applied to numerous pods. In this case, the method may include searching a plurality of pods to find pods that can be matched to the tags of the selected test routine. The method may then include applying the selected test routine to each of the pods. For example, FIG. 5B illustrates a flowchart 500b for a method of selecting from among a plurality of test routines to apply to a selected pod in an automated application test suite, according to some embodiments. This method may include receiving a selection of a pod with required tags with provided tags (510). The method may then include searching a plurality of test routines for test routines for which all required tags for both the test routine and the pod are satisfied (512). The method may further include applying the selected test routines to the pod using an application test suite (514).

It should be appreciated that the specific steps illustrated in FIGS. 5A-5B provide particular methods of matching test routines with pods according to various embodiments of the present invention. Other sequences of steps may also be performed according to alternative embodiments. For example, alternative embodiments of the present invention may perform the steps outlined above in a different order. Moreover, the individual steps illustrated in FIGS. 5A-5B may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 6 illustrates a chart 600 depicting the relative cost and complexity of operations involved with the three different relationship management techniques, according to some embodiments. It should be noted that the dual tagging method described herein performs at least as efficiently as both the rule-based scheme and the intersection table scheme. Chart 600 shows the computational complexity of the five most common operations in maintaining and updating an automated test suite. These operations include adding a new test routine ("entity A"), adding a new pod ("entity B"), returning test routines that match a particular pod, returning pods that match a particular test routine, and then adding a new relationship ("rule") that relates pods to test routines. Note that in the dual tagging method, this operation may be completed by simply changing the tags of either a test routine or a pod.

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 7:
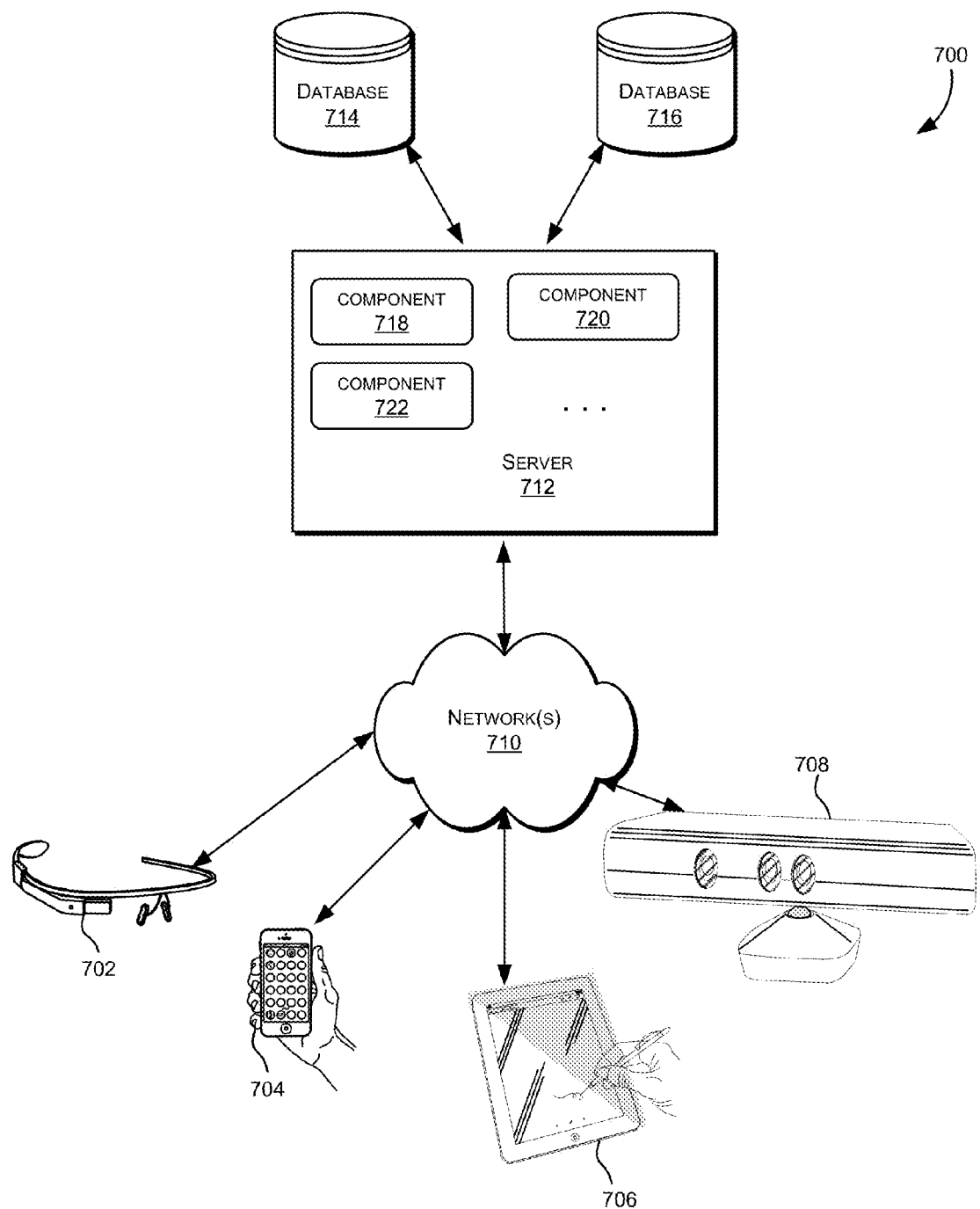
FIG. 7 illustrates a simplified block diagram of a distributed system for implementing some of the embodiments.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
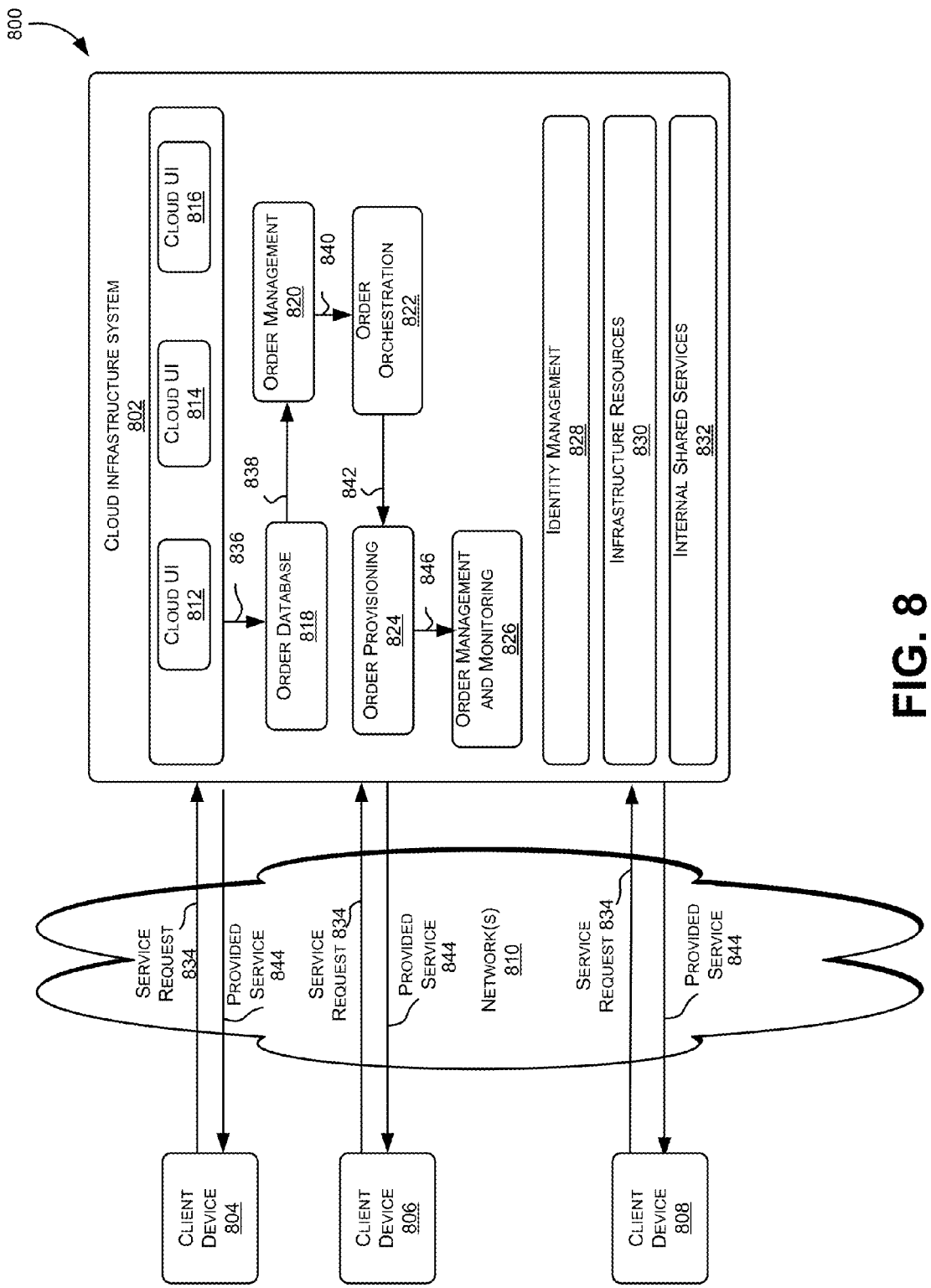
FIG. 8 illustrates a simplified block diagram of components of a system environment by which services provided by the components of an embodiment system may be offered as cloud services.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

Cloud infrastructure system 802 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
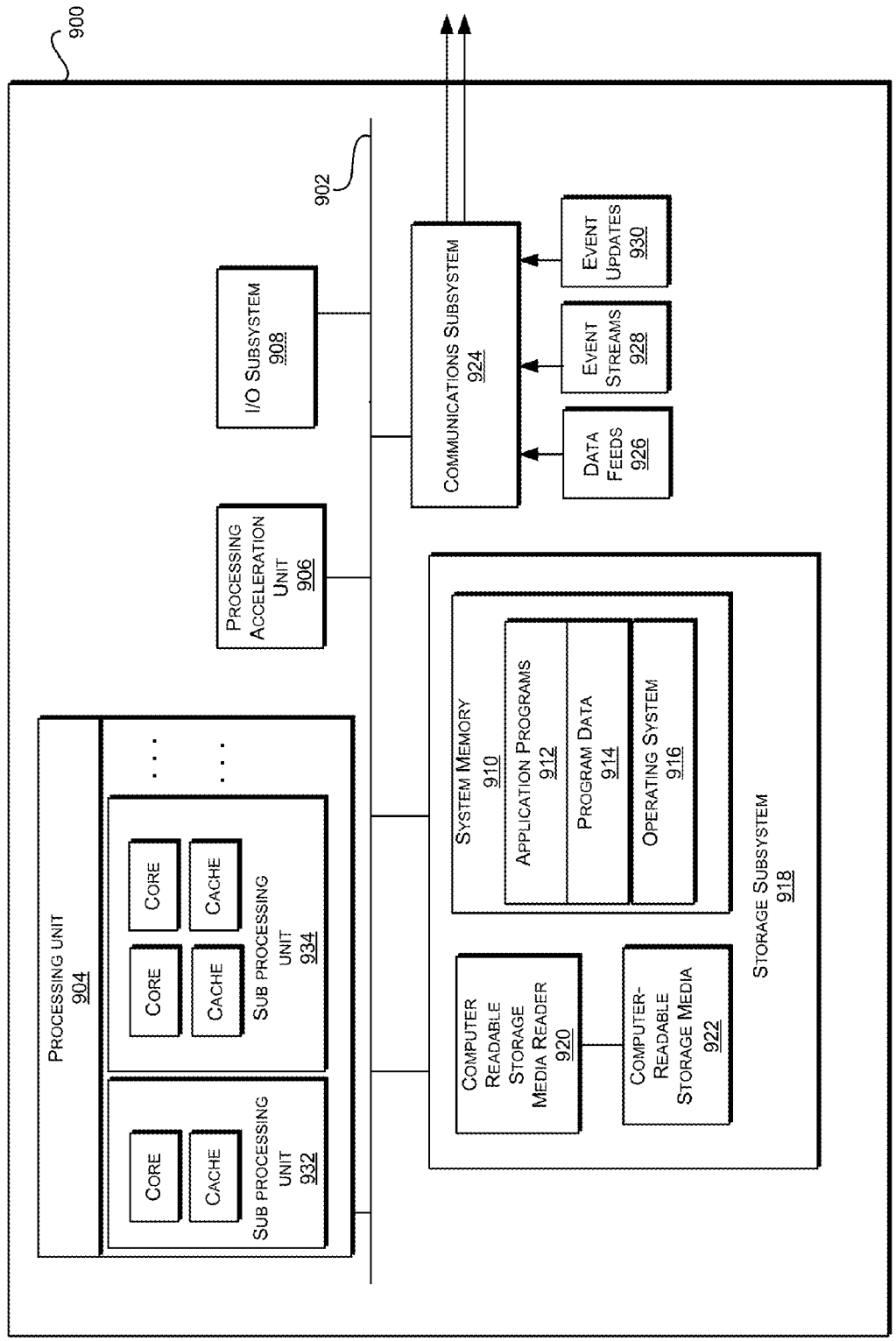
FIG. 9 illustrates an exemplary computer system, in which various embodiments may be implemented.

FIG. 9 illustrates an exemplary computer system 900, in which various embodiments of the present invention may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of applying test routines to applications in an automated application test suite, the method comprising:
   receiving a selection of an application from among a plurality of applications, wherein the application is associated with:
      one or more first required tags that indicate software features required of test routines in order to be compatible with the application; and
      one or more first provided tags that indicate software features provided by the application;
   receiving a selection of a test routine from among a plurality of test routines, wherein the test routine is associated with:
      one or more second required tags that indicate features required of applications in order to be compatible with the test routine, wherein the one or more first required tags are distinct from the one or more second required tags; and
      one or more second provided tags that indicate features provided by the test routine, wherein the one or more first provided tags are distinct from the one or more second provided tags; and
   determining whether the one or more first required tags of the application are satisfied by the one or more second provided tags of the test routine; and
   determining whether the one or more second required tags of the test routine are satisfied by the one or more first provided tags of the application.

2. The method of claim 1, further comprising causing the test routine to be applied to the application if it is determined that the one or more first required tags of the application are satisfied by the one or more second provided tags of the test routine, and that the one or more second required tags of the test routine are satisfied by the one or more first provided tags of the application.

3. The method of claim 1, wherein the application comprises a software component operating with the application, and an application version level.

4. The method of claim 3, wherein the application further comprises hardware characteristics of a server on which the application is running.

5. The method of claim 1, wherein one or more second provided tags of the test routine comprises tags that are not required by the one or more first required tags of the application.

6. The method of claim 1, wherein one or more first provided tags of the application comprises tags that are not required by the one or more second required tags of the test routine.

7. The method of claim 1 wherein the application is selected by the automated application test suite.

8. The method of claim 1 further comprising:
searching the plurality of test routines to locate a set of test routines for which required tags of the application and required tags of the set of test routines can be satisfied; and
applying the set of test routines to the application.

9. The method of claim 1 further comprising:
searching the plurality of applications to locate a set of applications for which required tags of the test routine and required tags of the set of applications can be satisfied; and
applying the test routine to the set of applications.

10. A non-transitory, computer-readable memory comprising a sequence of instructions which, when executed by one or more processors, causes the one or more processors to perform operations comprising:
receiving a selection of an application from among a plurality of applications, wherein the application is associated with:
one or more first required tags that indicate software features required of test routines in order to be compatible with the application; and
one or more first provided tags that indicate software features provided by the application;
receiving a selection of a test routine from among a plurality of test routines, wherein the test routine is associated with:
one or more second required tags that indicate features required of applications in order to be compatible with the test routine, wherein the one or more first required tags are distinct from the one or more second required tags; and
one or more second provided tags that indicate features provided by the test routine, wherein the one or more first provided tags are distinct from the one or more second provided tags; and
determining whether the one or more first required tags of the application are satisfied by the one or more second provided tags of the test routine; and
determining whether the one or more second required tags of the test routine are satisfied by the one or more first provided tags of the application.

11. The non-transitory, computer-readable memory of claim 10, wherein the application comprises an application, a software component operating with the application, an application version level, and hardware characteristics of a server on which the application is running.

12. The non-transitory, computer-readable memory of claim 10, wherein one or more second provided tags of the test routine comprises tags that are not required by the one or more first required tags of the application, and/or one or more first provided tags of the application comprises tags that are not required by the one or more second required tags of the test routine.

13. The non-transitory, computer-readable memory of claim 10, wherein the application is selected by the real-time application test suite.

14. The non-transitory, computer-readable memory of claim 10, wherein the sequence of instructions causes the one or more processors to perform operations further comprising:
searching the plurality of test routines to locate a set of test routines for which required tags of the application and required tags of the set of test routines can be satisfied; and
applying the set of test routines to the application.

15. The non-transitory, computer-readable memory of claim 10, wherein the sequence of instructions causes the one or more processors to perform operations further comprising:
searching the plurality of applications to locate a set of applications for which required tags of the test routine and required tags of the set of applications can be satisfied; and
applying the test routine to the set of applications.

16. A system comprising:
one or more processors; and
a non-transitory memory communicatively coupled with and readable by the one or more processors and comprising a sequence of instructions which, when executed by the one or more processors, causes the one or more processors to perform operations comprising:
receiving a selection of an application from among a plurality of applications, wherein the application is associated with:
one or more first required tags that indicate software features required of test routines in order to be compatible with the application; and
one or more first provided tags that indicate software features provided by the application;
receiving a selection of a test routine from among a plurality of test routines, wherein the test routine is associated with:
one or more second required tags that indicate features required of applications in order to be compatible with the test routine, wherein the one or more first required tags are distinct from the one or more second required tags; and
one or more second provided tags that indicate features provided by the test routine, wherein the one or more first provided tags are distinct from the one or more second provided tags; and
determining whether the one or more first required tags of the application are satisfied by the one or more second provided tags of the test routine; and
determining whether the one or more second required tags of the test routine are satisfied by the one or more first provided tags of the application.

17. The system of claim 16, wherein the application comprises a software component operating with the application, an application version level, and hardware characteristics of a server on which the application is running.

18. The system of claim 16, wherein one or more second provided tags of the test routine comprises tags that are not required by the one or more first required tags of the application, and/or one or more first provided tags of the application comprises tags that are not required by the one or more second required tags of the test routine.

19. The system of claim 16, wherein the sequence of instructions causes the one or more processors to perform operations further comprising:
  searching the plurality of test routines to locate a set of test routines for which required tags of the application and required tags of the set of test routines can be satisfied; and
  applying the set of test routines to the application.

20. The non-transitory, computer-readable memory of claim 10, wherein:
  the application comprises a plurality of software components comprising a search interface, a database interface, a software security product, and a federated identity module, each of the plurality of software components being associated with one of the one or more first provided tags of the application;
  the application operates on a virtual server, and the one or more first provided tags of the application comprise a throughput, an available memory, a processor speed, an I/O configuration, a network connection, and a network latency the virtual server on which the application operates;
  the one or more first required tags and the one or more first provided tags are stored in a first database table that comprises a first identifier that identifies the application;
  the one or more second required tags and the one or more second provided tags are stored as annotations within a source code of the test routine that is compiled into a test program code of the test routine and cached in memory, such that changes to the one or more second required tags or the one or more second provided tags of the test routine require the source code to be recompiled; and
  the sequence of instructions causes the one or more processors to perform operations further comprising:
    adding a new test routine to the plurality of test routines, wherein adding the new test routine to the plurality of test routines is executed in constant time;
    searching the plurality of applications to locate a set of applications for which required tags of the new test routine and required tags of the set of applications can be satisfied, wherein locating the set of applications is executed in linear time;
    applying the new test routine to the set of applications;
    adding a new application to the plurality of applications, wherein adding the new application to the plurality of applications is executed in constant time;
    searching the plurality of test routines to locate a set of test routines for which required tags of the new application and required tags of the set of test routines can be satisfied, wherein locating the set of test routines is executed in linear time;
    applying the set of test routines to the new application.

* * * * *

UNITED STATES PATENT AND TRADEMARK OFFICE
CERTIFICATE OF CORRECTION

PATENT NO. : 9,785,543 B2  
APPLICATION NO. : 14/293943  
DATED : October 10, 2017  
INVENTOR(S) : Danko Page 1 of 1

It is certified that error appears in the above-identified patent and that said Letters Patent is hereby corrected as shown below:

In the Specification

In Column 1, Lines 65-66, delete "and one/or" and insert -- and/or one --, therefor.

In Column 2, Line 19, delete "and one/or" and insert -- and/or one --, therefor.

In Column 3, Line 6, after "embodiments" insert -- . --.

In Column 12, Line 58, delete "infra-red" and insert -- infrared --, therefor.

In the Claims

In Column 24, Line 9, in Claim 13, delete "real-time" and insert -- automated --, therefor.

Signed and Sealed this  
Fifth Day of June, 2018

Andrei Iancu  
*Director of the United States Patent and Trademark Office*